United States Patent
Gupta et al.

(10) Patent No.: US 12,306,723 B2
(45) Date of Patent: May 20, 2025

(54) MAINTAINING DATA INTEGRITY FOR BACKED UP FILES

(71) Applicant: Dell Products L.P., Round Rock, TX (US)

(72) Inventors: Kaushik Gupta, Pune (IN); Shiv S. Kumar, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/319,268

(22) Filed: May 17, 2023

(65) Prior Publication Data

US 2024/0385933 A1    Nov. 21, 2024

(51) Int. Cl.
*G06F 16/00* (2019.01)
*G06F 11/14* (2006.01)
*G06F 16/11* (2019.01)

(52) U.S. Cl.
CPC ........ *G06F 11/1458* (2013.01); *G06F 16/122* (2019.01); *G06F 2201/84* (2013.01)

(58) Field of Classification Search
CPC . G06F 11/1458; G06F 16/122; G06F 2201/84
See application file for complete search history.

(56) References Cited

U.S. PATENT DOCUMENTS

| | | | | |
|---|---|---|---|---|
| 7,685,377 B1* | 3/2010 | Milligan | ........... | G06F 16/24568 711/216 |
| 10,120,579 B1* | 11/2018 | Patiejunas | ............... | G06F 3/061 |
| 10,528,520 B2* | 1/2020 | Eda | ......... | G06F 3/0643 |
| 10,740,287 B2* | 8/2020 | Haviv | .................... | G06F 3/0685 |
| 2008/0243955 A1* | 10/2008 | Anderson | ........... | G06F 11/1446 |
| 2015/0370643 A1* | 12/2015 | Rueger | ................. | G06F 16/182 707/652 |
| 2016/0188229 A1* | 6/2016 | Rabinovich | ......... | G06F 11/1469 711/114 |
| 2017/0103100 A1* | 4/2017 | Sharma | ............... | G06F 11/1448 |
| 2017/0235953 A1* | 8/2017 | Thadikaran | ........... | G06F 3/0673 726/24 |
| 2021/0342344 A1* | 11/2021 | Kowolenko | ...... | G06F 16/24578 |

* cited by examiner

*Primary Examiner* — Alexander Khong
(74) *Attorney, Agent, or Firm* — Amin, Turocy & Watson, LLP

(57) ABSTRACT

A system can determine that an integrity of a data backup is to undergo a validation process, wherein the data backup is located at a target location, and wherein the data backup comprises a backup of source data at a source location. The system can identify a subset of files of the source data to validate in the data backup, wherein the subset of files is determined prior to performing the determining that the integrity of the data backup is to undergo the validation process. The system can, as part of validation of the subset of files according to the validation process, validate respective first hashes of respective files of the subset of files relative to respective second hashes of respective corresponding second files of the data backup, to produce a validation result. The system can store the validation result.

20 Claims, 14 Drawing Sheets

400

(402)

DETERMINING THAT AN INTEGRITY OF A DATA BACKUP IS TO UNDERGO A VALIDATION PROCESS, WHEREIN THE DATA BACKUP IS LOCATED AT A TARGET LOCATION, AND WHEREIN THE DATA BACKUP COMPRISES A BACKUP OF SOURCE DATA AT A SOURCE LOCATION 404

IDENTIFYING A SUBSET OF FILES OF THE SOURCE DATA TO VALIDATE IN THE DATA BACKUP, WHEREIN THE SUBSET OF FILES IS DETERMINED PRIOR TO PERFORMING THE DETERMINING THAT THE INTEGRITY OF THE DATA BACKUP IS TO UNDERGO THE VALIDATION PROCESS 406

AS PART OF VALIDATION OF THE SUBSET OF FILES ACCORDING TO THE VALIDATION PROCESS, VALIDATING RESPECTIVE FIRST HASHES OF RESPECTIVE FILES OF THE SUBSET OF FILES RELATIVE TO RESPECTIVE SECOND HASHES OF RESPECTIVE CORRESPONDING SECOND FILES OF THE DATA BACKUP, TO PRODUCE A VALIDATION RESULT 408

STORING THE VALIDATION RESULT 410

IDENTIFYING AN INDICATION THAT THE THIRD FILE IS THE MEMBER OF THE SUBSET OF FILES IN AN EXTENDED ATTRIBUTE OF THE THIRD FILE 604

DETERMINING THAT A THIRD FILE OF THE SUBSET OF FILES IS A MEMBER OF THE SUBSET OF FILES 606

DETERMINING THAT AN INTEGRITY OF A DATA BACKUP IS TO BE VALIDATED, WHEREIN THE DATA BACKUP IS LOCATED AT A TARGET LOCATION, AND WHEREIN THE DATA BACKUP COMPRISES A BACKUP OF SOURCE DATA AT A SOURCE LOCATION 804

↓

IDENTIFYING A SUBSET OF FILES OF THE SOURCE DATA TO VALIDATE IN THE DATA BACKUP, WHEREIN THE SUBSET OF FILES IS DETERMINED PRIOR TO THE DETERMINING THAT THE INTEGRITY OF THE DATA BACKUP IS TO BE VALIDATED 806

↓

VALIDATING RESPECTIVE FIRST HASHES OF RESPECTIVE FILES OF THE SUBSET OF FILES WITH RESPECT TO RESPECTIVE SECOND HASHES OF RESPECTIVE CORRESPONDING SECOND FILES OF THE DATA BACKUP 808

DETERMINING TO VALIDATE FILES OPERATED UPON BY A FIRST USER ACCOUNT IN RESPONSE TO A SECOND USER ACCOUNT DESIGNATING THE FIRST USER ACCOUNT FOR VALIDATION 904

DETERMINING THAT A THIRD FILE OF THE SUBSET OF FILES IS A MEMBER OF THE SUBSET OF FILES IN RESPONSE TO THE FIRST USER ACCOUNT PERFORMING A FILE OPERATION ON THE THIRD FILE 906

DETERMINING TO VALIDATE AN INTEGRITY OF A DATA BACKUP, WHEREIN THE DATA BACKUP IS LOCATED AT A TARGET LOCATION, AND WHEREIN THE DATA BACKUP COMPRISES A BACKUP OF SOURCE DATA AT A SOURCE LOCATION 1104

↓

IDENTIFYING A SUBSET OF FILES OF THE SOURCE DATA TO VALIDATE IN THE DATA BACKUP 1106

↓

VALIDATING RESPECTIVE FIRST HASHES OF RESPECTIVE FILES OF THE SUBSET OF FILES AGAINST RESPECTIVE SECOND HASHES OF RESPECTIVE CORRESPONDING SECOND FILES OF THE DATA BACKUP 1108

| DETERMINING THAT THE FIRST REVISION OF THE DATA BACKUP IS CORRUPT 1304 |

↓

| RECREATING THE FIRST REVISION OF THE DATA BACKUP AND THE SECOND REVISION OF THE DATA BACKUP 1306 |

MAINTAINING DATA INTEGRITY FOR BACKED UP FILES

BACKGROUND

Computer data can be backed up to mitigate against data loss, such as by storing a copy of the computer data on another computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine that an integrity of a data backup is to undergo a validation process, wherein the data backup is located at a target location, and wherein the data backup comprises a backup of source data at a source location. The system can identify a subset of files of the source data to validate in the data backup, wherein the subset of files is determined prior to performing the determining that the integrity of the data backup is to undergo the validation process. The system can, as part of validation of the subset of files according to the validation process, validate respective first hashes of respective files of the subset of files relative to respective second hashes of respective corresponding second files of the data backup, to produce a validation result. The system can store the validation result.

An example method can comprise determining, by a system comprising a processor, that an integrity of a data backup is to be validated, wherein the data backup is located at a target location, and wherein the data backup comprises a backup of source data at a source location. The method can further comprise identifying, by the system, a subset of files of the source data to validate in the data backup, wherein the subset of files is determined prior to the determining that the integrity of the data backup is to be validated. The method can further comprise validating, by the system, respective first hashes of respective files of the subset of files with respect to respective second hashes of respective corresponding second files of the data backup.

An example non-transitory computer-readable medium can comprise instructions that, in response to execution, cause a system comprising a processor to perform operations. These operations can comprise determining to validate an integrity of a data backup, wherein the data backup is located at a target location, and wherein the data backup comprises a backup of source data at a source location. These operations can further comprise identifying a subset of files of the source data to validate in the data backup. These operations can further comprise validating respective first hashes of respective files of the subset of files against respective second hashes of respective corresponding second files of the data backup.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example process flow that can facilitate maintaining data integrity for backed up files, in accordance with an embodiment of this disclosure;

FIG. 6 illustrates another example process flow that can facilitate maintaining data integrity for backed up files, in accordance with an embodiment of this disclosure;

FIG. 8 illustrates another example process flow that can facilitate maintaining data integrity for backed up files, in accordance with an embodiment of this disclosure;

FIG. 9 illustrates another example process flow that can facilitate maintaining data integrity for backed up files, in accordance with an embodiment of this disclosure;

FIG. 11 illustrates another example process flow that can facilitate maintaining data integrity for backed up files, in accordance with an embodiment of this disclosure;

FIG. 13 illustrates another example process flow that can facilitate maintaining data integrity for backed up files, in accordance with an embodiment of this disclosure;

DETAILED DESCRIPTION

Overview

Figure 1:
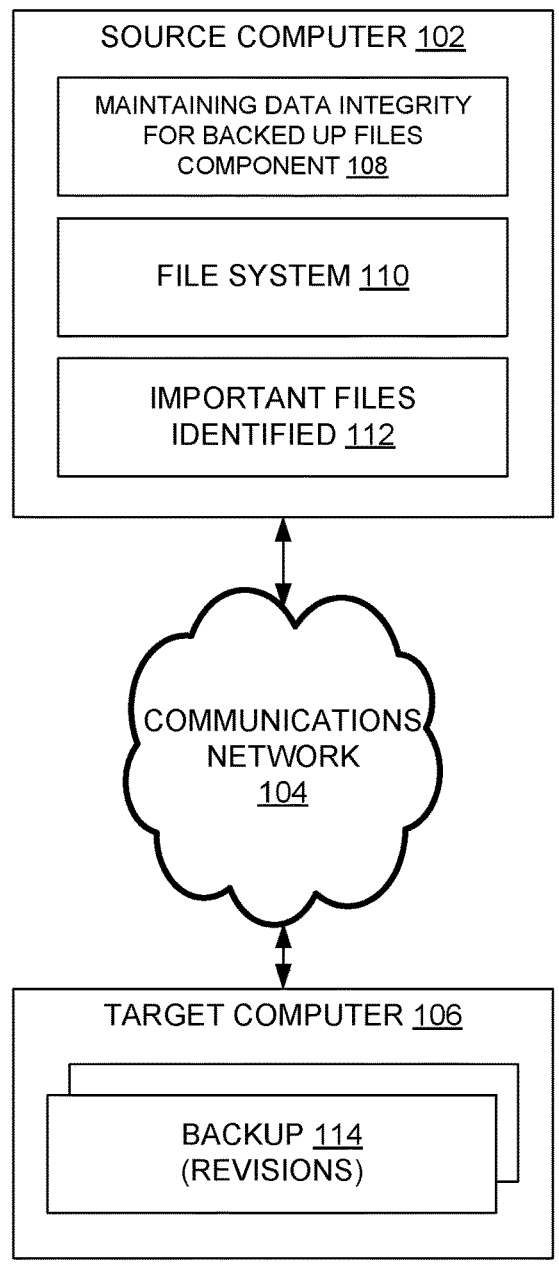
FIG. 1 illustrates an example system architecture that can facilitate maintaining data integrity for backed up files, in accordance with an embodiment of this disclosure.

In a data backup scenario, the target directory where the backups are stored can be read-only. If not, recovery could result in data corruption.

Consider a scenario where there are two clusters, DM1 and DM2. In this scenario, DM1 has files f1, f2, and f3 that are backed up to a location in D2 (so, DM2 also has f1, f2, and f3). DM2 is writeable, so someone updates f1 and f2 to f1' and f2', respectively. While this occurs, a new file f4 is added to DM1.

DM1 can back up f4 to DM2. So, now DM2 stores f1', f2', f3, and f4, whereas DM1 has f1, f2, f3, and f4.

Where DM1 loses f1 and needs to recover it from DM2, it does not get f1, but rather gets f1', so DM1's backup on DM2 is corrupted.

In some examples, this type of scenario can happen to any type of object. If a cloud object is not locked, another user can intentionally or unintentionally update that object. There can be cases where a target is supposed to be read-only, but is set to read-write by mistake and someone writes to it. The present techniques can be implemented to handle problems such as these.

A target or remote cluster's backup path can become writable due to system or administrator error. It can be that the only way to confirm this is to compare the hash of the file from the source to the same as that at the backup location.

Comparing the hash of every file can be a tedious job. There can be an alternative according to the present techniques that is cost effective, while still providing a confidence that the target datasets are not corrupted.

The present techniques can be implemented to facilitate a backup data integrity job, which can be scheduled similar to other computer jobs.

A backup data integrity job can include the following input parameters:
Source Account I Target Account I Source path I Target path I Dataset record id I
IP1 I IP2 I !home/a I !home/x I O (Latest) I
IP1 I IP4 I !home/b I !homely I 0 I
IP3 I JPS I !home/c I !home/z I 2 I For each row in an input table, the job can compare the hash of certain files (e.g., important files) in the source relative to the corresponding file at the target. If the dataset-record-id is given as 0, it can mean, "compare files from the latest dataset." Otherwise, the dataset-record-id can be used to select the dataset from where the files should be matched.

If the hash does not match for any file, an event can be generated and an associated backup policy will be marked as "disabled."

Identifying files to compare (e.g., "certain files" or "important files") can be performed as follows. This designation can be made in response to receiving user input data. User input data can indicate marking certain files as important. External attributes of these files can specify that they are important.

User input data from an administrator can indicate marking certain user accounts as important. In this scenario, it can be that whenever an important user account performs a file operation on a file, that file is deemed to be important.

In other scenarios, a computer system that implements the present techniques can identify files to compare. The system can identify files to compare based on statistics, such as a heat map, where the system identifies which files are to be compared and updates external attributes appropriately.

In other examples, the system can identify files to compare randomly. That is, a random file can be selected from random directories of a source path. A hash of these selected files (on the source and target) can be compared. In some examples, a random approach can be implemented to spot check data integrity without incurring the processing resources overhead of specifically selecting which files to compare.

These techniques can be performed in conjunction with each other. That is, there can be an example where files are identified for comparison based on user input data and based on system statistics.

Rebuilding a backup after identifying a loss in data integrity can be performed as follows. Upon identifying that data integrity is lost, a critical event can be raised so that administrators become aware of the loss in data integrity. Additionally, a backup can be rebuilt.

Rebuilding a backup can be performed as follows. The dataset at the target (and all subsequent datasets) can be marked as both corrupt and expired. An expiry policy at the target can be run. In some examples, this can be initiated by setting a run-now flag in the expiry policy, which can cause the expiry policy to be run now, as opposed to at a future scheduled time. An expiry job that corresponds to the expiry policy can clean up datasets that are marked as expired. While the expiry job performs this task, it can be that other jobs are prohibited from using datasets that are marked as corrupt.

Then, a repeat-copy policy can be run from the source to the target by setting a run-now flag for the repeat-copy policy. The repeat-copy policy can be implemented in an incremental job, and recreate a backup at the target.

This example generally involves a disaster (e.g., data corruption) at the target. As such, it can be that the corrupted data sets are cleaned up, and data is resent from the source to the target to rebuild the backup.

In examples where the latest dataset is found to be corrupted, a rebuilding process can be cheap (relative to an older dataset being found to be corrupted) in terms of computing resources. In such examples, it can be that only a latest dataset is deleted, and data corresponding to only one dataset will be backed up.

In examples where an older dataset (relative to a latest dataset) is found to be corrupted, a rebuilding process can be expensive (relative to the latest dataset being found to be corrupted) in terms of computing resources.

Take an example where the latest dataset is at revision-5, and corruption is found at revision-3 (so there is also a revision-4 of the dataset that is newer than where the corruption is found). Dataset-3, dataset-4, and dataset-5 can each be marked as corrupt and expired. A dataset-expiry job can clean up each of dataset-3, dataset-4, and dataset-5. Data corresponding to each of dataset-3, dataset-4, and dataset-5 can be backed up.

In some examples, it can be that all files are sent from the target to the source even though only one file is corrupted. In some examples, it can be that this is unlikely and there is a possibility that other files are also impacted, and that confirming this involves comparing hashes for each file in each dataset. It can be that re-backing up the entire dataset (and thus knowing that the new backup has no corrupted files) can conserve processing resources relative to checking all of the files and re-backing up only the ones found to be corrupted.

Similarly, in an example where a file in revision-3 is corrupted and this is identified when the revisions are up to revision-7, it can be that revision-3, revision-4, revision-5, revision-6, and revision-7 could be impacted. Instead of identifying what percentage of corrupt files can result in recovery, in some examples, a corrective operation for the entire dataset can be performed instead of consuming computing resources on identifying corrupt files.

EXAMPLE ARCHITECTURES

FIG. 1 illustrates an example system architecture 100 that can facilitate maintaining data integrity for backed up files, in accordance with an embodiment of this disclosure. While the present examples generally relate to computer data represented as files, it can be appreciated that they can be applied to other types of computer data backup, such as on an object storage system.

System architecture 100 source computer 102, communications network 104, and target computer 106. In turn, source computer 102 comprises maintaining data integrity for backed up files component 108, file system 110, and important files identified 112; and target computer 106 comprises backup 114.

Figure 14:
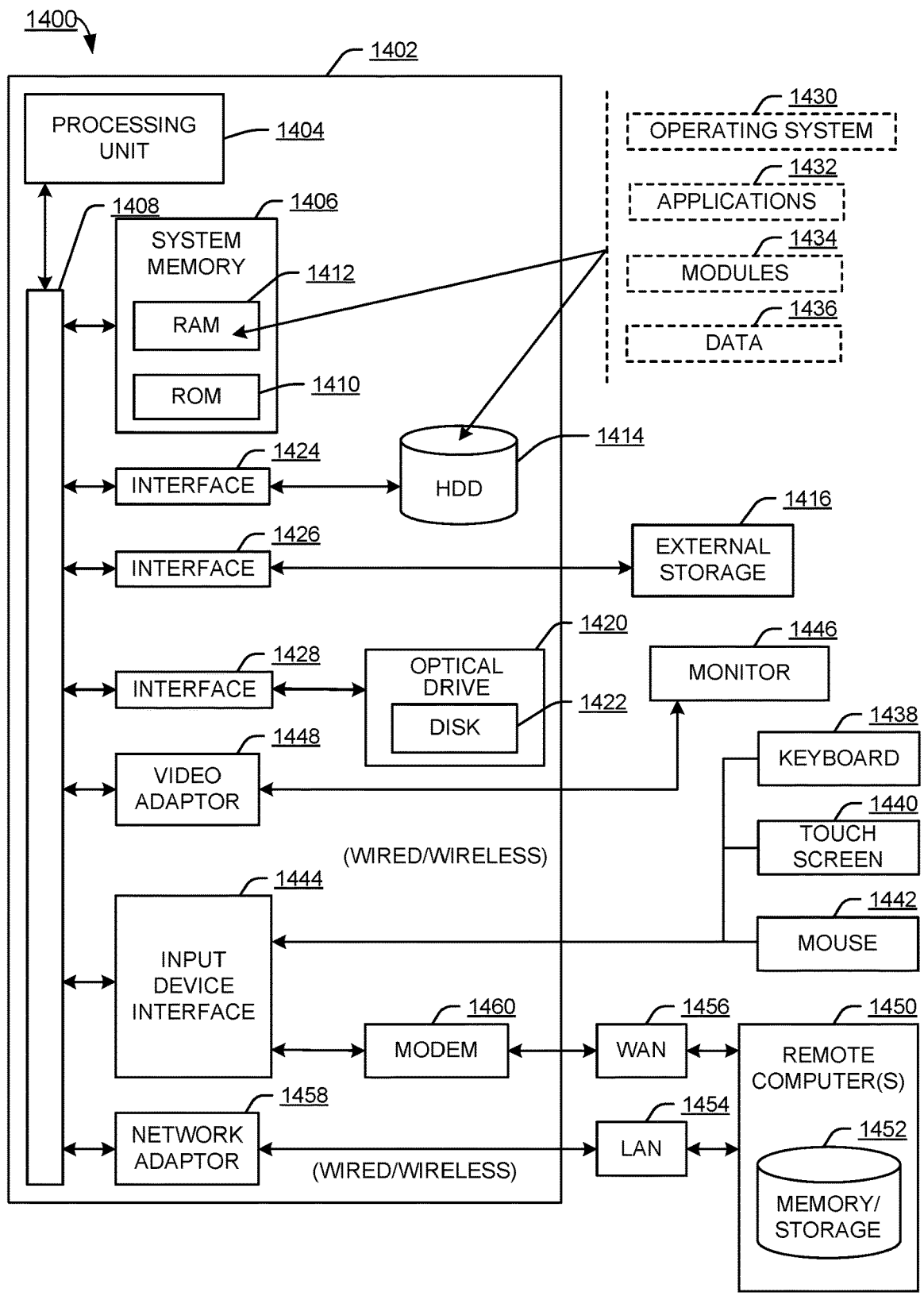
FIG. 14 illustrates an example block diagram of a computer operable to execute an embodiment of this disclosure.

Each of source computer 102 and/or target computer 106 can be implemented with part(s) of computing environment 1400 of FIG. 14. Communications network 104 can comprise a computer communications network, such as the Internet.

File system 110 can comprise a file system on source computer 102 that is backed up by backup 114 on target computer 106. Backup 114 can comprise one or more revisions of a backup of file system 110, where each revision can represent a backup of file system 110 at a certain point in time.

Maintaining data integrity for backed up files component 108 can validate that backup 114 is an accurate backup of file system 110 (e.g., that there is no data corruption in backup 114). In doing so, in some examples, rather than validating every file in backup 114, maintaining data integrity for backed up files component 108 can validate a subset of those files, as identified by important files identified 112. It can be appreciated that, in some examples, a file need not satisfy some standard of importance to be part of the subset of files that are validated.

In some examples, important files identified 112 can be stored in respective extended attributes of respective files in file system 110. In validating a backup, maintaining data integrity for backed up files component 108 can check each file-that-is-part-of-backup-114's extended attribute in file system 110, and compare hash values between those files in file system 110 and corresponding files in backup 114.

Where each of these subset of files is validated, maintaining data integrity for backed up files component 108 can determine that all of backup 114 is validated. In some examples, where not each of these subset of files is validated, maintaining data integrity for backed up files component 108 can determine that all of backup 114 is invalid.

In some examples, maintaining data integrity for backed up files component 108 can implement part(s) of the process flows of FIGS. 3-13 to implement maintaining data integrity for backed up files.

It can be appreciated that system architecture 100 is one example system architecture for maintaining data integrity for backed up files, and that there can be other system architectures that facilitate maintaining data integrity for backed up files.

Figure 2:
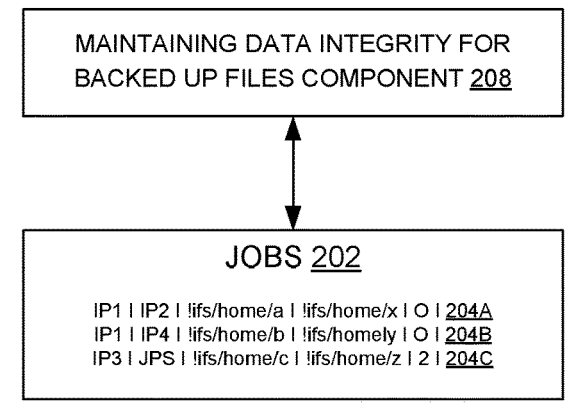
FIG. 2 illustrates another example system architecture that can facilitate maintaining data integrity for backed up files, in accordance with an embodiment of this disclosure.

FIG. 2 illustrates another example system architecture 200 that can facilitate maintaining data integrity for backed up files, in accordance with an embodiment of this disclosure. In some examples, part(s) of system architecture 200 can be used to implement part(s) of system architecture 100 of FIG. 1, such as part(s) of maintaining data integrity for backed up files component 108.

System architecture 200 comprises jobs 202 (which comprises IP1 I IP2 I !home/a I !home/x I 0 I 204A, IP1 I IP4 I!home/b I !homely I 0 I 204B, and IP3 I JPS I !home/c I !home/z I 2 I 204C), and maintaining data integrity for backed up files component 208 (which can be similar to maintaining data integrity for backed up files component 108 of FIG. 1).

Maintaining data integrity for backed up files component 208 can perform backup validations as indicated by jobs, and on a schedule. A job can identify a source computer address (e.g., "IP1" in IP1 I IP2 I !home/a I !home/x I 0 I 204A), a target computer address (e.g., "IP1" in IP1 I IP2 I !home/a I !home/x I 0 I 204A), a source file system location (e.g., "!home/a" in IP1 I IP2 I !home/a I !home/x I 0 I 204A), a target backup location (e.g., "!home/x" in IP1 I IP2 I !home/a I !home/x I 0 I 204A), and a backup revision to validate (e.g., revision 0 in IP1 I IP2 I !home/a I !home/x I 0 I 204A).

Figure 3:
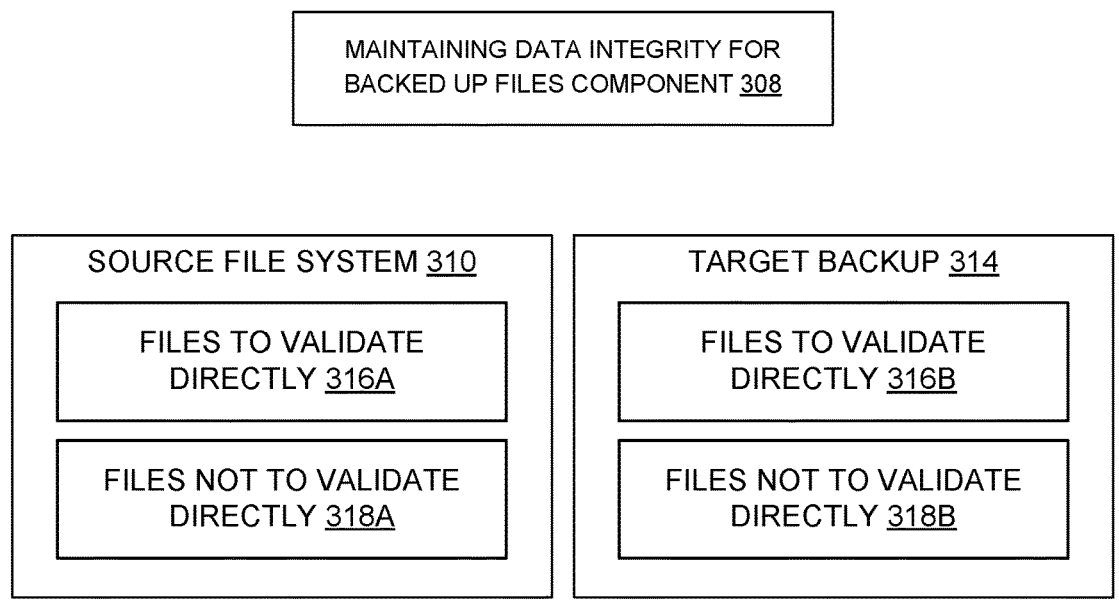
FIG. 3 illustrates another example system architecture that can facilitate maintaining data integrity for backed up files, in accordance with an embodiment of this disclosure.

FIG. 3 illustrates another example system architecture 300 that can facilitate maintaining data integrity for backed up files, in accordance with an embodiment of this disclosure. In some examples, part(s) of system architecture 300 can be used to implement part(s) of system architecture 100 of FIG. 1, such as part(s) of maintaining data integrity for backed up files component 108.

System architecture 300 comprises maintaining data integrity for backed up files component 308, source file system 310 (which comprises files to validate directly 316A and files not to validate directly 318A), and target backup 314 (which comprises files to validate directly 316B and files not to validate directly 318B). Maintaining data integrity for backed up files component 308 can be similar to maintaining data integrity for backed up files component 108 of FIG. 1; source file system 310 can be similar to file system 110; and target backup 314 can be similar to backup 114.

It can be that maintaining data integrity for backed up files component 308 validates only some files in target backup 314 in the process of validating target backup 314. For instance, maintaining data integrity for backed up files component 308 can validate files to validate directly 316B (against files to validate directly 316A from source file system 310) and files not to validate directly 316B (against files not to validate directly 316A from source file system 310).

EXAMPLE PROCESS FLOWS

FIG. 4 illustrates an example process flow 400 that can facilitate maintaining data integrity for backed up files, in accordance with an embodiment of this disclosure. In some examples, one or more embodiments of process flow 400 can be implemented by maintaining data integrity for backed up files component 108 of FIG. 1, or computing environment 1400 of FIG. 14.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 400 begins with 402, and moves to operation 404.

Operation 404 depicts determining that an integrity of a data backup is to undergo a validation process, wherein the data backup is located at a target location, and wherein the data backup comprises a backup of source data at a source location. That is, using the example of FIG. 1, backup 114 can be the data backup stored at target computer 106, which can be the target location. Backup 114 can be a backup of part of file system 110, which can be the source data, and source computer 102 can be the source location. In some examples, the validation process can be performed as a validation job by maintaining data integrity for backed up files component 108.

After operation 404, process flow 400 moves to operation 406.

Operation 406 depicts identifying a subset of files of the source data to validate in the data backup, wherein the subset of files is determined prior to performing the determining that the integrity of the data backup is to undergo the validation process. Continuing with the example of FIG. 1, this subset of files can be important files identified 112 (where identifying these files can comprise accessing these identifications) as they exist in file system 110.

In some examples, the respective files of the subset of files have been determined to satisfy an importance criterion. In some examples, respective third files of the source data that are not included in the subset of files have been determined to fail to satisfy the importance criterion. That is, it can be that the files checked as part of validating a backup can be those files deemed to be important (and the number of such files can vary from file set to file set), and then the files not checked as part of validating a backup can be the remaining files-those that have not been identified as important.

After operation 406, process flow 400 moves to operation 408.

Operation 408 depicts, as part of validation of the subset of files according to the validation process, validating respective first hashes of respective files of the subset of files relative to respective second hashes of respective corresponding second files of the data backup, to produce a validation result. Continuing with the example of FIG. 1, that is, instead of validating every file in backup 114, only those files identified by important files identified 112 can be validated. A result of validating those files can stand in for a result of validating every file. For example, where those files are validated (by comparing a hash of them against hashes of corresponding files in file system 110), then it can be determined that all of backup 114 is validated, even though not all files in backup 114 have been checked as part of validation.

After operation 408, process flow 400 moves to operation 410.

Operation 410 depicts storing the validation result. This can comprise maintaining data integrity for backed up files component 108 storing an indication of whether the validation succeeded or failed. Where the validation failed, a mitigation action can be taken, such as recovering valid copies of the files from file system 110 to backup 114.

After operation 410, process flow 400 moves to 412, where process flow 400 ends.

Figure 5:
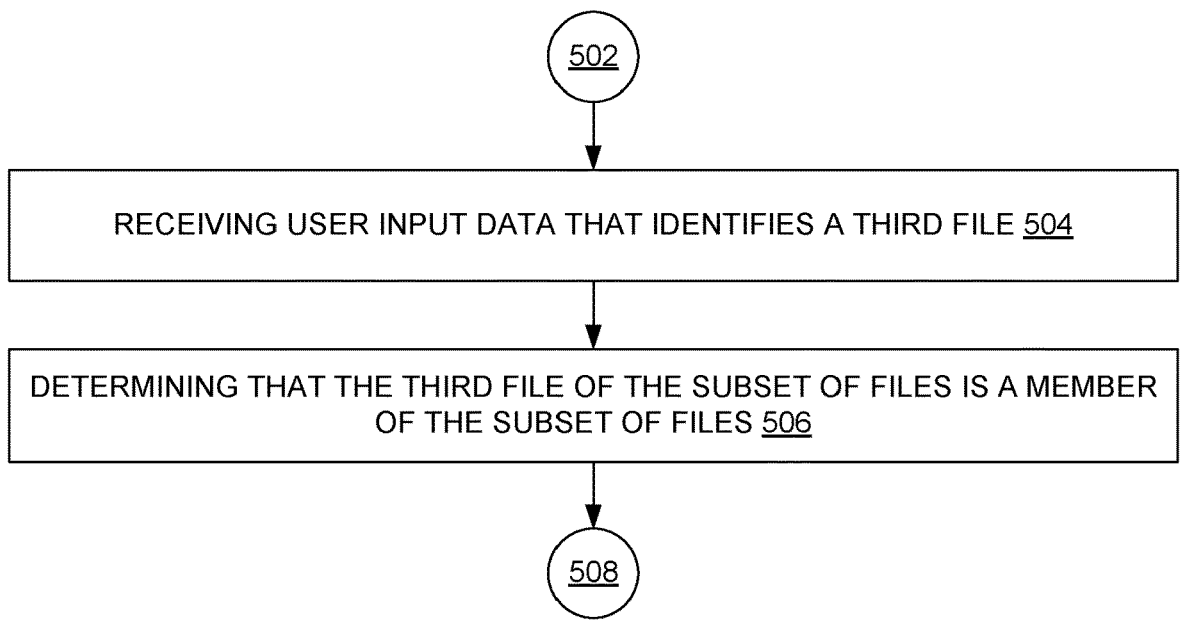
FIG. 5 illustrates another example process flow that can facilitate maintaining data integrity for backed up files, in accordance with an embodiment of this disclosure.

FIG. 5 illustrates an example process flow 500 that can facilitate maintaining data integrity for backed up files, in accordance with an embodiment of this disclosure. In some examples, one or more embodiments of process flow 500 can be implemented by maintaining data integrity for backed up files component 108 of FIG. 1, or computing environment 1400 of FIG. 14.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 500 begins with 502, and moves to operation 504.

Operation 504 depicts receiving user input data that identifies a third file. That is, users can identify which files are important, or otherwise to be validated in validating a backup, and this indication can be stored in important files identified 112 of FIG. 1.

After operation 504, process flow 500 moves to operation 506.

Operation 506 depicts determining that a third file of the subset of files is a member of the subset of files. That is, as part of identifying a subset of files of the source data to validate in the data backup in operation 406 of FIG. 4, important files identified 112 of FIG. 1 can be accessed, and where a user has identified the third file as being important, and this indication is stored in important files identified 112, the third file can be identified in operation 406.

After operation 506, process flow 500 moves to 508, where process flow 500 ends.

FIG. 6 illustrates an example process flow 600 that can facilitate maintaining data integrity for backed up files, in accordance with an embodiment of this disclosure. In some examples, one or more embodiments of process flow 600 can be implemented by maintaining data integrity for backed up files component 108 of FIG. 1, or computing environment 1400 of FIG. 14.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 600 begins with 602, and moves to operation 604.

Operation 604 depicts identifying an indication that the third file is the member of the subset of files in an extended attribute of the third file. That is, some file systems can store files along with metadata for those files in extended attributes. In some examples, each file can have its own extended attributes (such as extended attributes stored in inodes that correspond to inodes in which corresponding file data is stored). An extended attribute for a file can be used to store an indication that that file is important. In some examples, maintaining data integrity for backed up files component 108 can periodically scan the extended attributes of files in file system 110, and upon determining that a file has an extended attribute that marks it as important, save that indication to important files identified 112. In other examples, this scan can be performed at the time a data validation occurs.

In some examples, an identification of a user account that writes to a file is stored at a time that a write/modify operation is performed. A job that is responsible for maintaining data integrity can then, at run time, identify a file as important based on this stored identification of the user account.

After operation 604, process flow 600 moves to operation 606.

Operation 606 depicts determining that a third file of the subset of files is a member of the subset of files. That is, as part of identifying a subset of files of the source data to validate in the data backup in operation 406 of FIG. 4, important files identified 112 of FIG. 1 can be accessed, and where the third file has been as being important in an extended attribute, and this indication is stored in important files identified 112, the third file can be identified in operation 406.

After operation 606, process flow 600 moves to 608, where process flow 600 ends.

Figure 7:
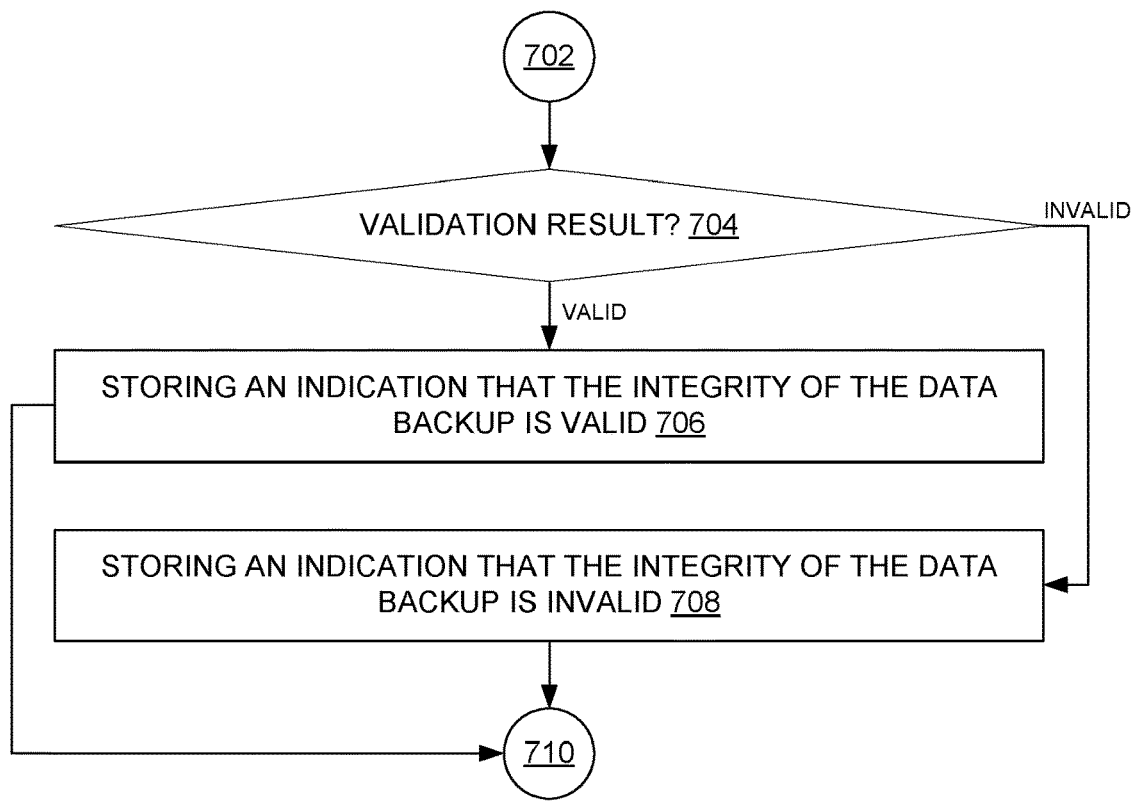
FIG. 7 illustrates another example process flow that can facilitate maintaining data integrity for backed up files, in accordance with an embodiment of this disclosure.

FIG. 7 illustrates an example process flow 700 that can facilitate maintaining data integrity for backed up files, in accordance with an embodiment of this disclosure. In some examples, one or more embodiments of process flow 700 can be implemented by maintaining data integrity for backed up files component 108 of FIG. 1, or computing environment 1400 of FIG. 14.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 700 begins with 702, and moves to operation 704.

Operation 704 depicts analyzing the validation result. This can be the validation result determined in operation 408 of FIG. 4.

Where in operation 704, the validation result is analyzed to indicate that the respective first hashes match the respective second hashes, process flow 700 moves to operation 706. Instead, where in operation 704, the validation result is analyzed to indicate that the respective first hashes differ from the respective second hashes, process flow 700 moves to operation 708.

Operation 706 is reached from operation 704 where the validation result is analyzed to indicate that the respective first hashes match the respective second hashes. Operation 706 depicts storing an indication that the integrity of the data backup is valid. That is, where the important files of a backup are validated, then it can be determined that the entire backup is validated, even though not all files of the backup have been examined.

After operation 706, process flow 700 moves to operation 710, where process flow 700 ends.

Operation 708 is reached from operation 704 where the validation result is analyzed to indicate that the respective first hashes differ from the respective second hashes. Operation 708 depicts storing an indication that the integrity of the data backup is invalid. That is, where the important files of a backup are determined to be invalid, then it can be determined that the entire backup is invalid.

After operation 708, process flow 700 moves to operation 710, where process flow 700 ends.

FIG. 8 illustrates an example process flow 800 that can facilitate maintaining data integrity for backed up files, in accordance with an embodiment of this disclosure. In some examples, one or more embodiments of process flow 800 can be implemented by maintaining data integrity for backed up files component 108 of FIG. 1, or computing environment 1400 of FIG. 14.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, process flow 1000 of FIG. 10, process flow 1100 of FIG. 11, process flow 1200 of FIG. 12, and/or process flow 1300 of FIG. 13.

Process flow 800 begins with 802, and moves to operation 804.

Operation 804 depicts determining that an integrity of a data backup is to be validated, wherein the data backup is located at a target location, and wherein the data backup comprises a backup of source data at a source location. In some examples, operation 804 can be implemented in a similar manner as operation 404 of FIG. 4.

After operation 804, process flow 800 moves to operation 806.

Operation 806 depicts identifying a subset of files of the source data to validate in the data backup, wherein the subset of files is determined prior to the determining that the integrity of the data backup is to be validated. In some examples, operation 806 can be implemented in a similar manner as operation 406 of FIG. 4.

After operation 806, process flow 800 moves to operation 808.

Operation 808 depicts validating respective first hashes of respective files of the subset of files with respect to respective second hashes of respective corresponding second files of the data backup. In some examples, operation 808 can be implemented in a similar manner as operation 408 of FIG. 4.

In some examples, operation 808 comprises, in response to determining that the validating indicates that at least one of the second files of the data backup is invalid, performing a corrective operation for all files of the data backup. That is, a corrective action for an entire backup can be performed where any corrupt is found, as opposed to consuming computing resources on determining exactly which files in a backup are corrupt.

After operation 808, process flow 800 moves to 810, where process flow 800 ends.

FIG. 9 illustrates an example process flow 900 that can facilitate maintaining data integrity for backed up files, in accordance with an embodiment of this disclosure. In some examples, one or more embodiments of process flow 900 can be implemented by maintaining data integrity for backed up files component 108 of FIG. 1, or computing environment 1400 of FIG. 14.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, process flow 1200 of FIG. 12, and/or process flow 1300 of FIG. 13.

Process flow 900 begins with 902, and moves to operation 904.

Operation 904 depicts determining to validate files operated upon by a first user account in response to a second user account designating the first user account for validation. That is, an administrator (in some examples), can mark certain users as important. Then, when an important user performs a file operation on a particular file, that file is designated as important.

After operation 904, process flow 900 moves to operation 906.

Operation 906 depicts determining that a third file of the subset of files is a member of the subset of files in response to the first user account performing a file operation on the third file. In some examples, the file operation comprises a create operation, a read operation, a write operation, or a delete operation.

After operation 906, process flow 900 moves to 908, where process flow 900 ends.

Figure 10:
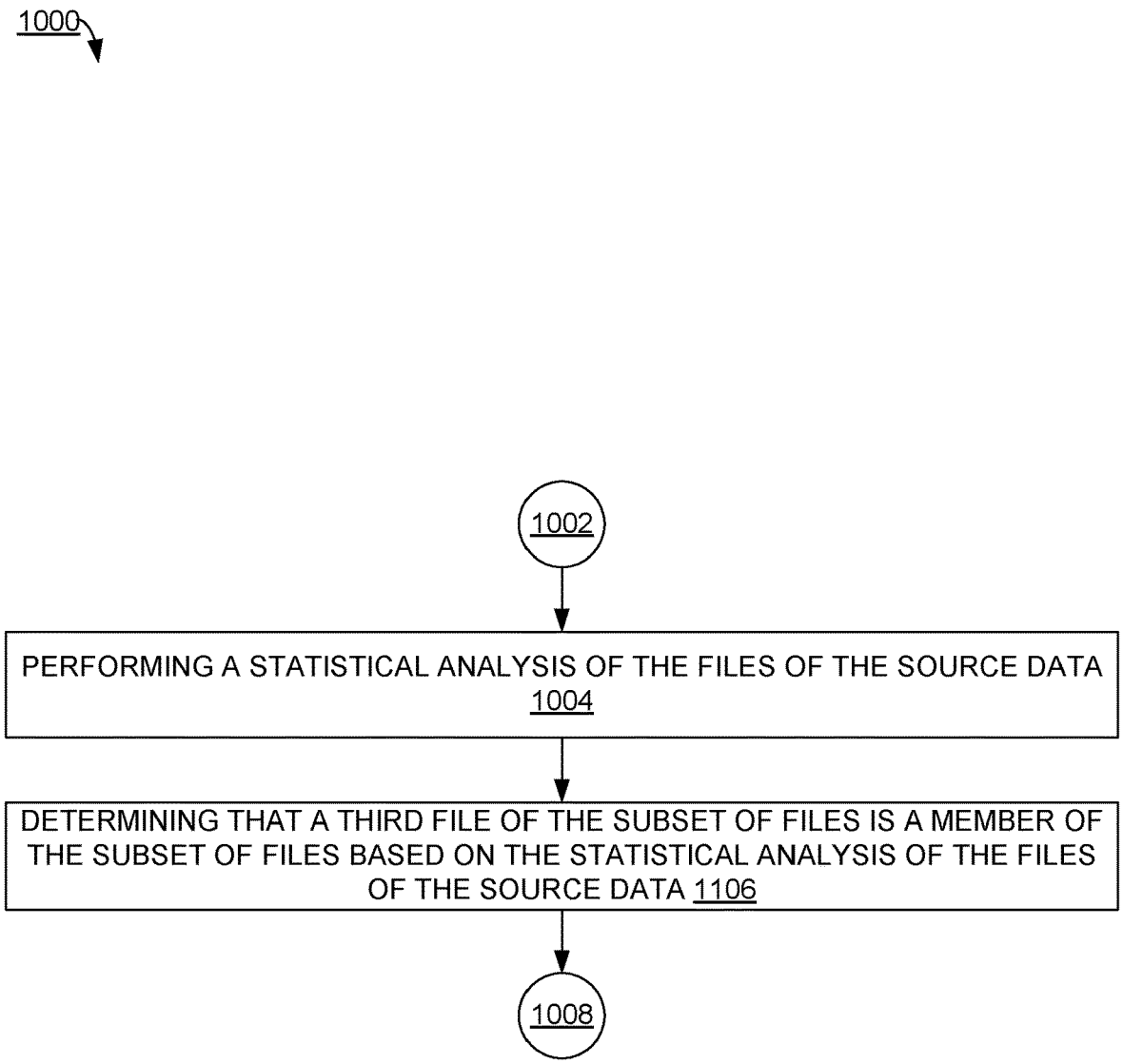
FIG. 10 illustrates another example process flow that can facilitate maintaining data integrity for backed up files, in accordance with an embodiment of this disclosure.

FIG. 10 illustrates an example process flow 1000 that can facilitate maintaining data integrity for backed up files, in accordance with an embodiment of this disclosure. In some examples, one or more embodiments of process flow 1000 can be implemented by maintaining data integrity for backed up files component 108 of FIG. 1, or computing environment 1400 of FIG. 14.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1100 of FIG. 11, process flow 1200 of FIG. 12, and/or process flow 1300 of FIG. 13.

Process flow 1000 begins with 1002, and moves to operation 1004.

Operation 1004 depicts performing a statistical analysis of the files of the source data. This statistical analysis can be used to indicate which files are important.

After operation 1004, process flow 1000 moves to operation 1106.

Operation 1106 depicts determining that a third file of the subset of files is a member of the subset of files based on the statistical analysis of the files of the source data. In some examples, the statistical analysis can comprise a heat map of the files of the source data. A heat map can indicate how often After operation 1004, process flow 1000 moves to 1008, where process flow 1000 ends.

FIG. 11 illustrates an example process flow 1100 that can facilitate maintaining data integrity for backed up files, in accordance with an embodiment of this disclosure. In some examples, one or more embodiments of process flow 1100 can be implemented by maintaining data integrity for backed up files component 108 of FIG. 1, or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1200 of FIG. 12, and/or process flow 1300 of FIG. 13.

Process flow 1100 begins with 1102, and moves to operation 1104.

Operation 1104 depicts determining to validate an integrity of a data backup, wherein the data backup is located at a target location, and wherein the data backup comprises a backup of source data at a source location. In some examples, operation 1104 can be implemented in a similar manner as operation 404 of FIG. 4.

After operation 1104, process flow 1100 moves to operation 1106.

Operation 1106 depicts identifying a subset of files of the source data to validate in the data backup. In some examples, operation 1106 can be implemented in a similar manner as operation 406 of FIG. 4.

In some examples, the subset of files are selected randomly. In some examples, the subset of files are selected from random directories of a source path of the source data. This can be performed in contrast to using files that are marked as important.

After operation 1106, process flow 1100 moves to operation 1108.

Operation 1108 depicts validating respective first hashes of respective files of the subset of files against respective second hashes of respective corresponding second files of the data backup. In some examples, operation 1108 can be implemented in a similar manner as operation 408 of FIG. 4.

After operation 1108, process flow 1100 moves to 1110, where process flow 1100 ends.

Figure 12:
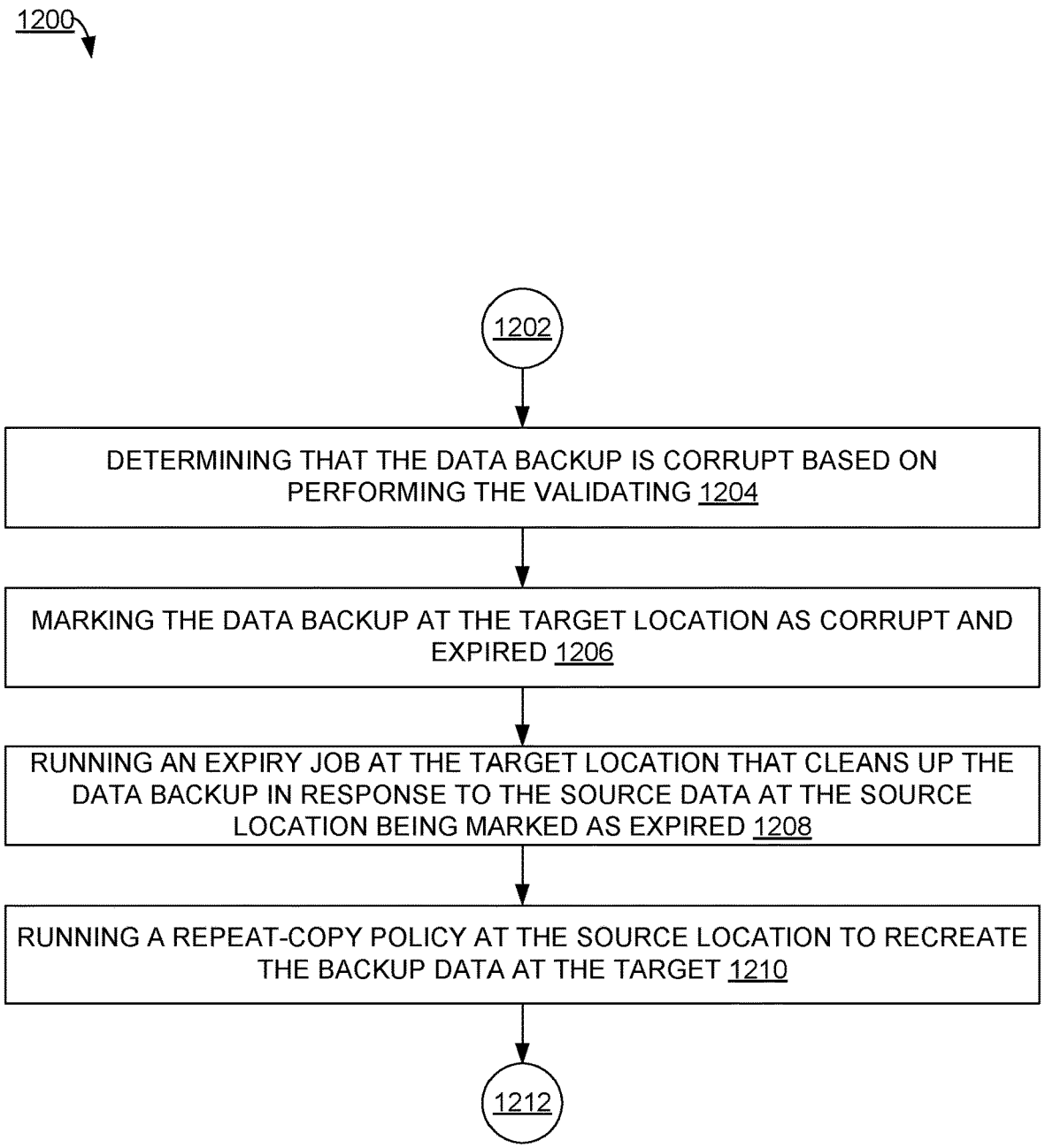
FIG. 12 illustrates another example process flow that can facilitate maintaining data integrity for backed up files, in accordance with an embodiment of this disclosure.

FIG. 12 illustrates an example process flow 1200 that can facilitate maintaining data integrity for backed up files, in accordance with an embodiment of this disclosure. In some examples, one or more embodiments of process flow 1200 can be implemented by maintaining data integrity for backed up files component 108 of FIG. 1, or computing environment 1400 of FIG. 14.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1300 of FIG. 13.

Process flow 1200 begins with 1202, and moves to operation 1204.

Operation 1204 depicts determining that the data backup is corrupt based on performing the validating. In some examples, this can be determined as a result of performing operation 408 of FIG. 4.

After operation 1204, process flow 1200 moves to operation 1206.

Operation 1206 depicts marking the data backup at the target location as corrupt and expired. In some examples, this can be performed for subsequent revisions of the data backup.

After operation 1206, process flow 1200 moves to operation 1208.

Operation 1208 depicts running an expiry job at the target location that cleans up the data backup in response to the source data at the source location being marked as expired.

This expiry job can comprise an expiry policy, and can be run immediately by setting a run-now flag in the policy. An expiry job can clean up data sets marked as expired, and while this occurs, it can be that no other job uses a data set that is marked as corrupt.

After operation 1208, process flow 1200 moves to operation 1210.

Operation 1210 depicts running a repeat-copy policy at the source location to recreate the backup data at the target. That is, a repeat-copy policy can be run from the source location to the target location by setting a run-now flag in the policy, and this repeat-copy policy can perform an incremental job to recreate the backup at the target.

In some examples, running the repeat-copy policy at the source location to recreate the backup data at the target comprises transferring a first file of the source data from the source location to the target location independently of determining that the first file is corrupted. That is, in a case where at least one file is determined to be corrupt, an entire new backup can be sent from the source to the target. This can be less-expensive in terms of computing resources relative to first identifying exactly which files are corrupt, or using a threshold percentage of corrupt files to prompt recovery.

After operation 1210, process flow 1200 moves to 1212, where process flow 1200 ends.

FIG. 13 illustrates an example process flow 1300 that can facilitate maintaining data integrity for backed up files, in accordance with an embodiment of this disclosure. In some examples, one or more embodiments of process flow 1300 can be implemented by maintaining data integrity for backed up files component 108 of FIG. 1, or computing environment 1400 of FIG. 14.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

In the example of process flow 1300, a data backup is a first revision of a data backup, there is a second revision of the data backup at a target location, and the second revision is newer than the first location.

Process flow 1300 begins with 1302, and moves to operation 1304.

Operation 1304 depicts determining that the first revision of the data backup is corrupt. That is, there can be multiple revisions of a data set, and an older version of the data set can be found to be corrupted (e.g., corruption is found in revision-3 when the latest revision is revision-5).

After operation 1304, process flow 1300 moves to operation 1306.

Operation 1306 depicts recreating the first revision of the data backup and the second revision of the data backup. In such cases, the invalid data set and subsequent revisions can each be marked as corrupt and expired. A dataset-expiry job can clean up all these data sets, and each data set can be backed up anew from the source.

After operation 1306, process flow 1300 moves to 1308, where process flow 1300 ends.

EXAMPLE OPERATING ENVIRONMENT

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of source computer 102 and/or target computer 106 of FIG. 1.

In some examples, computing environment 1400 can implement one or more embodiments of the process flows of FIGS. 4-13 to facilitate maintaining data integrity for backed up files.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the at least one processor, comprising instructions that, in response to execution by the processor, cause the system to perform operations, comprising:
      determining that an integrity of a data backup is to undergo a validation process, wherein the data backup is located at a target location, and wherein the data backup comprises a backup of source data at a source location;
      identifying a subset of files of the source data to validate in the data backup, wherein the subset of files is determined prior to performing the determining that the integrity of the data backup is to undergo the validation process, wherein respective files of the subset of files have been determined to satisfy an importance criterion based on respective metadata for the respective files comprising an indication of satisfying the importance criterion, wherein the respective metadata is stored separately from other metadata of the metadata, and wherein the importance criterion is identified based on user input data;
      as part of validation of the subset of files according to the validation process, validating respective first hashes of the respective files of the subset of files relative to respective second hashes of respective corresponding second files of the data backup, to produce a validation result; and
      storing the validation result.

2. The system of claim 1, wherein respective third files of the source data that are not included in the subset of files have been determined to fail to satisfy the importance criterion.

3. The system of claim 1, wherein the operations further comprise:
   determining that a third file of the subset of files is a member of the subset of files in response to receiving user input data that identifies the third file.

4. The system of claim 1, wherein the validation result indicates that the respective first hashes match the respective second hashes, and wherein the operations further comprise:
   storing an indication that the integrity of the data backup is valid.

5. The system of claim 1, wherein the validation result indicates that the respective first hashes differ from the respective second hashes, and wherein the operations further comprise:
   storing an indication that the integrity of the data backup is invalid.

6. A method, comprising:
   determining, by a system comprising at least one processor, that an integrity of a data backup is to be validated, wherein the data backup is located at a target location, and wherein the data backup comprises a backup of source data at a source location;
   identifying, by the system, a subset of files of the source data to validate in the data backup, wherein the subset of files is determined prior to the determining that the integrity of the data backup is to be validated, wherein respective files of the subset of files have been determined to satisfy an importance criterion based on respective metadata for the respective files comprising an indication of satisfying the importance criterion, wherein the respective metadata is stored separately from other metadata of the metadata, and wherein the importance criterion is identified based on user input data; and validating, by the system, respective first hashes of the respective files of the subset of files with respect to respective second hashes of respective corresponding second files of the data backup.

7. The method of claim 6, further comprising:
determining, by the system, that a third file of the subset of files is a member of the subset of files in response to a first user account performing a file operation on the third file.

8. The method of claim 7, further comprising:
determining, by the system, to validate files operated upon by the first user account in response to a second user account designating the first user account for validation.

9. The method of claim 7, wherein the file operation comprises a create operation, a read operation, a write operation, or a delete operation.

10. The method of claim 6, further comprising:
in response to determining that the validating indicates that at least one of the second files of the data backup is invalid, performing, by the system, a corrective operation for all files of the data backup.

11. The method of claim 6, further comprising:
determining, by the system, that a third file of the subset of files is a member of the subset of files based on a statistical analysis of the files of the source data.

12. The method of claim 6, further comprising:
determining, by the system, that a third file of the subset of files is a member of the subset of files based on a heat map of the files of the source data.

13. A non-transitory computer-readable medium comprising instructions that, in response to execution, cause a system comprising at least one processor to perform operations, comprising:
determining to validate an integrity of a data backup, wherein the data backup is located at a target location, and wherein the data backup comprises a backup of source data at a source location;
identifying a subset of files of the source data to validate in the data backup, wherein respective files of the subset of files have been determined to satisfy an importance criterion based on respective metadata for the respective files comprising an indication of satisfying the importance criterion, and wherein the respective metadata is stored separately from other metadata of the metadata; and
validating respective first hashes of the respective files of the subset of files against respective second hashes of respective corresponding second files of the data backup.

14. The non-transitory computer-readable medium of claim 13, wherein the subset of files are selected randomly.

15. The non-transitory computer-readable medium of claim 13, wherein the subset of files are selected from random directories of a source path of the source data.

16. The non-transitory computer-readable medium of claim 13, wherein the operations further comprise:
determining that the data backup is corrupt based on performing the validating;
marking the data backup at the target location as corrupt and expired;
running an expiry job at the target location that cleans up the data backup in response to the source data at the source location being marked as expired; and
running a repeat-copy policy at the source location to recreate the backup data at the target.

17. The non-transitory computer-readable medium of claim 16, wherein the data backup is a first revision of the data backup, wherein there is a second revision of the data backup at the target location, wherein the second revision is newer than the first location, and wherein the operations further comprise:
recreating the first revision of the data backup and the second revision of the data backup in response to determining that the first revision of the data backup is corrupt.

18. The non-transitory computer-readable medium of claim 16, wherein running the repeat-copy policy at the source location to recreate the backup data at the target comprises transferring a first file of the source data from the source location to the target location independently of determining that the first file is corrupted.

19. The method of claim 6, wherein respective third files of the source data that are not included in the subset of files have been determined to fail to satisfy the importance criterion.

20. The non-transitory computer-readable medium of claim 13, wherein respective third files of the source data that are not included in the subset of files have been determined to fail to satisfy the importance criterion.

* * * * *